UNITED STATES PATENT OFFICE.

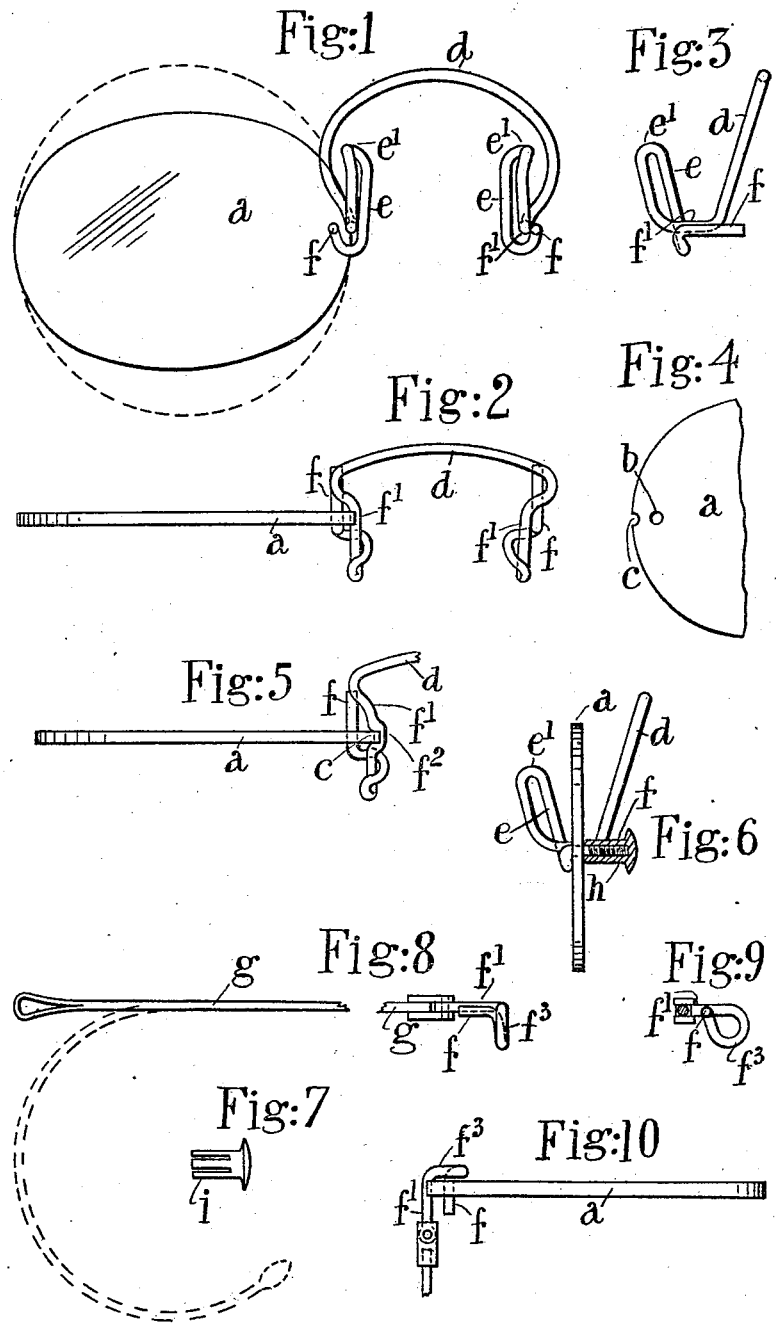

SYDNEY S. LAWRENCE, OF LONDON, ENGLAND.

SPECTACLES, EYEGLASSES, AND THE LIKE.

943,085.  Specification of Letters Patent.  Patented Dec. 14, 1909.

Application filed May 1, 1909. Serial No. 493,429.

*To all whom it may concern:*

Be it known that I, SYDNEY S. LAWRENCE, a subject of the King of Great Britain, residing at London, England, have invented new and useful Improvements in Spectacles, Eyeglasses, and the Like, of which the following is a specification.

The object of the present invention is to construct improved means for attaching the bridge, temples and other fittings of spectacles, eye-glasses and the like, to the lenses.

By means of the present invention I can avoid the use of screws and am able very readily to change the lenses.

According to the present invention I drill a hole, as usual, near to the edge of a lens, where it is desired to attach a bridge and plackets, and I may also groove or notch the edge of the lens in close proximity to said hole.

The bridge is formed with two parts which are connected at one end and have a tendency to spring toward each other. One part is pushed through the hole in the lens and the other part, when a groove or notch is formed in the lens, is caused to rest in said groove or notch, thereby gripping one edge of the lens firmly.

Various methods of carrying the invention into effect are shown in the accompanying drawings, but I do not limit my invention to these constructions.

Figure 1 is a rear elevation and Fig. 2 is a plan of a single lens and the bridge or connecting part of a pair of eye-glasses known as a pince-nez. Fig. 3 is a side elevation of the same bridge, and Fig. 4 is a front elevation of the same lens shown separately. Fig. 5 is a plan of part of a pince-nez showing a slight modification. Fig. 6 is a side elevation of a pair of eye-glasses showing another modification in which a nut is employed to more firmly hold the lenses. Fig. 7 shows a push-on cap which may be employed instead of the nut shown in Fig. 6. Fig. 8 is a side elevation and Fig. 9 is a rear elevation of part of a temple shown separately, and Fig. 10 is a plan of part of said temple attached to a lens.

The lens $a$ which may be of any desired shape has a hole $b$ drilled therein and it may be formed with a groove or notch $c$ in its edge close to the hole $b$. As shown in Figs. 1, 2 and 3, the bridge $d$ and the plackets $e$ are formed from a single length of wire by bending the same. The bridge $d$ may be flattened by hammering or otherwise to make it more flexible and to give it the nature of a spring. The method of bending the wire may be followed by the drawings. Each placket $e$ is formed of two parts connected together by a curved part $e'$ and acting as a spring to press toward each other the parts $f$, $f'$, which are connected to or continuations of the lower parts of the placket $e$. One part $f$ is passed through the hole $b$ in the lens and the other part $f'$ is placed in the groove $c$. The parts $f$, $f'$, are then parallel to each other or thereabout and grip the lens $a$ firmly between them. It will be noticed, at the right hand side of Figs. 1 and 2, that the parts $f$, $f'$, are in close contact and that the two parts of the placket $e$ are somewhat separated before the lens is placed in position. The parts $f$ and $f'$ are readily sprung apart for this purpose.

In Fig. 5 the part $f'$ is slightly grooved or curved at $f^2$ to pass around the edge of the lens and thereby retain it more firmly in position. As some users may prefer to have the lenses secured more firmly, when horse-riding or taking part in sports, I may, in some instances, form a thread on the part $f$, as shown in Fig. 6, and employ a nut or screw cap $h$ to retain the lenses as shown. Instead of the nut or screw cap $h$ I may employ a cap $i$ provided with spring arms, as shown in Fig. 7, to push on to the part $f$.

In Figs. 8, 9 and 10 the temple $g$ is pin-jointed at its end to a part $f'$, which latter is connected to the part $f$ by a curved portion $f^3$ acting as a spring. These parts $f$, $f'$, grip the outer edge of a lens $a$ in exactly similar manner to that above described. The temple $g$ may be straight, as shown in full lines, or formed to pass around the ear as shown in broken lines in Fig. 8, as is well understood.

When the invention is applied to a pince-nez, a very light and strong construction is obtained as there are not any separate parts to be screwed or soldered together.

What I claim is:—

1. In means for attaching a bridge, temple and other fittings to a lens, the combination with a lens containing a hole, of two parts connected together by a spring, one part passing through said hole and the other gripping the edge of the lens, substantially as set forth.

2. In means for attaching a bridge, temple and other fittings to a lens, the combination with a lens containing a hole, of two parts connected together by a spring, one part passing through said hole and the other having a groove gripping the edge of the lens, substantially as set forth.

3. In means for attaching a bridge, temple and other fittings to a lens, the combination with a lens containing a hole, of two parts connected together by a spring, one part passing through said hole having a screw thread thereon, a nut on said screw thread, and the other part gripping the edge of the lens, substantially as set forth.

4. In means for attaching a bridge, temple and other fittings to a lens, the combination with a lens containing a hole, of two parts connected together by a spring, one part passing through said hole having a screw thread thereon, a nut on said screw thread, and the other part having a groove gripping the edge of the lens, substantially as set forth.

In witness whereof I have hereunto set my hand in presence of two witnesses.

S. S. LAWRENCE.

Witnesses:
B. J. B. MILLS,
WM. GIRLING.